United States Patent
Towers et al.

(10) Patent No.: US 7,304,745 B2
(45) Date of Patent: Dec. 4, 2007

(54) PHASE MEASURING METHOD AND APPARATUS FOR MULTI-FREQUENCY INTERFEROMETRY

(75) Inventors: David Peter Towers, Edinburgh (GB); Catherine Elizabeth Towers, Edinburgh (GB); Julian David Clayton Jones, Edinburgh (GB)

(73) Assignee: Heriot-Watt University, Riccarton Campus, Edinburgh (GB)

( * ) Notice: Subject to any disclaimer, the term of this patent is extended or adjusted under 35 U.S.C. 154(b) by 233 days.

(21) Appl. No.: 10/526,443

(22) PCT Filed: Aug. 29, 2003

(86) PCT No.: PCT/GB03/03744

§ 371 (c)(1),
(2), (4) Date: Mar. 1, 2005

(87) PCT Pub. No.: WO2004/020937

PCT Pub. Date: Mar. 11, 2004

(65) Prior Publication Data

US 2006/0033929 A1    Feb. 16, 2006

(30) Foreign Application Priority Data

Sep. 2, 2002  (GB) ................... 0220228.1

(51) Int. Cl.
*G01B 9/02*    (2006.01)

(52) U.S. Cl. ....................................... 356/489

(58) Field of Classification Search ............... 356/489, 356/486, 499, 498, 511, 512, 477, 582
See application file for complete search history.

(56) References Cited

U.S. PATENT DOCUMENTS 6,208,416 B1    3/2001  Huntley et al.
2004/0190001 A1*  9/2004  Meggit et al. ............. 356/512

FOREIGN PATENT DOCUMENTS

WO    PCT/GB9700771    3/1997

OTHER PUBLICATIONS

*Shape Measurement Using a Fibre Optic Fringe Projector With Active Homodyne Phase-Stepping* Authors: A.J. Moore, R. McBride, J.S. Barton and J.D.C. Jones: 2000.

(Continued)

*Primary Examiner*—Hwa (Andrew) Lee
(74) *Attorney, Agent, or Firm*—Young Basile (57) ABSTRACT

The invention provides a novel method for absolute fringe order identification in multi-wavelength interferometry based on optimum selection of the wavelengths to be used. A theoretical model of the process is described which allows the process reliability to be quantified. The methodology produces a wavelength selection which is optimum with respect to the minimum number of wavelengths required to achieve a target dynamic measurement range. Conversely, the maximum dynamic range is produced from a given number of optimally selected wavelengths utilized in a sensor. The new concept introduced for optimum wavelength selection is scalable, i.e. from a three wavelength system to a four wavelength system, from four wavelengths to five, etc.

30 Claims, 6 Drawing Sheets

OTHER PUBLICATIONS

*Phase Stepping In Projected-Fringe Fibre-Based Moire Interferometry* Authors: J.D. Valera and J.D.C. Jones; Sep. 30, 1993.
*Automated Fringe Pattern Analysis in Experimental Mechanics: A Review* Author: J.M. Huntley.
*Shape Measurement By Temporal Phase Unwrapping: Comparison of Unwrapping Algorithms* Authors: J.M. Huntley and H.O. Saldner.
*Profilometry Using Temporal Phase Unwrapping and a Spatial Light Modulator-Based Fringe Project* Authors: Henrik. O. Saldner and Jonathon M. Huntley; Feb. 1997.
*Phase Measurement Interferometry Techniques* Author: Katherine Creath.
*Fourier-Transform Method of Fringe-Pattern Analysis for Computer-Based Topography and Interferometry* Authors: Mitsuo Takeda, Hideki Ina and Seiji Kobayashi; Aug. 27, 1981.
*Phase-Unwrapping Algorithm For the Measurement of Three-Dimensional Object Shapes* Authors: Hong Zhao, Wenyl Chen and Yushan Tan; Jul. 10, 1994.
*Synthetic Aperture Radar Interferometry* Authors: Paul A. Rosen, Scott Hensley, Ian R. Joughin, Fuk K. Li, Soren N. Madsen, Ernesto Rodriquez and Richard M. Goldstein: Mar. 2000.
*Multiple-Wavelength and Multiple-Source Holography Applied to Contour Generation* Authors: B.P. Hilderbrand and K.A. Haines: Aug. 5, 1966.
*Holographic and Speckle Pattern Interferometric Techniques For Shape Measurement Determination of Vibration Phase With Electronic Speckle Pattern Inteferometry (ESPI)* Authors: J.D. Valera, A.F. Doval and J.D.C. Jones: Dec. 3, 1992.

* cited by examiner

PHASE MEASURING METHOD AND APPARATUS FOR MULTI-FREQUENCY INTERFEROMETRY

The present invention relates generally to phase measuring sensors for measuring the phase of electromagnetic waves and, in particular, though not exclusively, to methods for determining absolute fringe order in fringe patterns obtained in such sensors.

The phase of electromagnetic waves projected onto an object can be affected by various measures of the object such as deformation [1], vibration [2], and refractive index variation due to density changes. Phase measuring sensors are often used for singe point or whole field profilometry, for example profiling of three-dimensional objects. There exist a host of interferometric based techniques for single point and whole field profilometry, from synthetic aperture radar (SAR) [3] to fringe projection [4]. In fringe projection techniques, a projected wavelength is generated by projection of a known fringe pattern (sometimes referred to as a "fringe map") onto the object of investigation, under a certain angle of incidence. In interferometric based sensors the third dimension of an object is coded in an interferogram or (in fringe projection techniques) in a deformed fringe pattern. In the following it will be understood that a deformed fringe pattern can be analysed, and phase information extracted therefrom, in the same way as an interferogram.

In an interference pattern there are two elements that contribute to the phase measurement dynamic range: the sub-fringe phase resolution and the number of fringes (fringe orders) spanned by the measurement. There is typically a simple function relating the measured optical fringe phase to the desired measurand. The process of phase measuring produces sub-fringe resolution, typically $1/100^{th}$ to $1/1000^{th}$ of a fringe. The sub-fringe resolution is calculated via either phase stepping [5] or Fourier transform techniques [6]. However, the interferometric phase is calculated using an inverse trigonometry function with principal values over the range $-\pi$ to $+\pi$ at best. Therefore the required phase information is 'wrapped' into an interval with sharp discontinuities in the data at the edges of that interval which must be spatially or temporally unwrapped to obtain the fringe order information. This problem is typically resolved by phase "unwrapping" (alternatively known as fringe counting). Conventional interferometric analysis for single point data relies on a temporal scan to measure the relative phase change in going from one state to another. In the case of whole field data, a spatial unwrapping is achieved using an appropriate algorithm giving relative information on the state (or change of state) across the image field [7].

A big disadvantage of conventional phase measuring systems is that only "relative" information can be obtained. Many industrial measurements require absolute information, for example in the measurement of range. In other cases absolute data is needed to overcome implementation issues which mean it is not possible to fringe count sufficiently rapidly to track from one state to another and so an absolute measurement of each state is necessary. In whole field sensors, a generic problem common to most interferometric techniques is the determination of absolute fringe order in interferograms/deformed fringe patterns containing phase discontinuities or spatially or temporally discrete samples. In such cases it is difficult to unambiguously determine fringe orders—giving absolute data—in the spatial unwrapping process. The spatial unwrapping process relies on the field being spatially contiguous i.e. it cannot be applied to determine relative phases for spatially separate objects or objects containing a discontinuity.

One approach to the unambiguous determination of fringe orders has been through the use of two wavelength interferometry techniques [see H Zhao, W Chen, Y Tan, Phase unwrapping algorithm for the measurement of 3D object shapes, Applied Optics, 33, 4497-4500 (1994)]. Here two wavelengths are heterodyned to generate a beat wavelength. In two wavelength interferometry using wavelengths $\lambda_0$ and $\lambda_1$, with $\lambda_0 < \lambda_1$, the unambiguous measurement range is increased (compared with single wavelength interfrometry) to the synthetic wavelength $\Lambda_{01}$ at the beat frequency, where $\Lambda_{01} = \lambda_0 \lambda_1 / (\lambda_1 - \lambda_0)$. From this, absolute data can be extracted. The ability to calculate a fringe order from measurements at two wavelengths removes the need to spatially unwrap, assuming that the heterodyne process is robust. However, there is a finite, non-zero, phase measurement noise in two wavelength heterodyne systems and as this phase noise increases the number of fringes which may be successfully heterodyned decreases. This means that two wavelength heterodyne sensors tend not to be very robust, in terms of giving unambiguous absolute data.

Another well established research area for absolute phase measurement is fringe projection for profilometry where the projected wavelengths produced can be varied relatively easily by varying the projected fringe pattern or the angle of incidence. Therefore techniques based on temporal phase unwrapping may be applied. Huntley et al introduced a temporal phase unwrapping approach using a reverse exponential series of projected fringes given by: s, s-1, s-2, s-4, . . . , s/2 [8]. This is the subject of International Patent Application Publication No. WO 97/36144. This technique allows $2^{N-1}$ fringes to be counted absolutely where N is the number of fringe frequencies used. Here, the unwrapping is performed between consecutive phase measurements to scale the fringe order calculated at the subsequent wavelength. Absolute fringe order is obtained as the unwrapping is performed at each pixel independently along the time axis. The number of projected fringe frequencies required is $(\log_2(s)+1)$. For each projected fringe frequency four phase stepped images are obtained to determine the wrapped phase values in the interval $-\pi$ to $+\pi$. For example, to measure over a range of 32 fringes 6 sets of 4 frames are needed, and for 128 fringes 8 sets of 4 frames. Therefore, considerable time is required to obtain the image frames, and as each image may contain >1 MB of information a significant data processing problem is generated. Furthermore, a mechanism must exist to generate the wide range of wavelengths required. This would be a particular problem if a technique other than fringe projection were being used as then it would be the optical wavelength which must be varied (not simply a synthetic wavelength).

It is an object of the present invention to avoid or minimise one or more of the foregoing disadvantages.

According to a first aspect of the invention there is provided a multi-frequency interferometry method for measuring the absolute phase of an electromagnetic wave, wherein the method comprises:

selecting a target measurement range, L, within which absolute phase measurements are desired to be made, said phase measurements being related to a desired measurand of an object;

determining a level of phase noise which will be present in wrapped phase measurements which will be made;

for the selected target measurement range, and the determined phase noise level, calculating an optimum number, N, of wavelengths of electromagnetic radiation to be used in the multi-frequency interferometry, where $N \geq 3$;

selecting an optimum series of values of said N wavelengths to achieve optimum noise immunity in wrapped phase measurements to be made; and carrying out multi-frequency interferometry at the selected values of the N wavelengths so as to make at least one wrapped phase measurement at each of the N wavelengths, which wrapped phase measurements are processed to obtain an absolute phase measurement related to the desired measurand of the object.

The processing of the wrapped phase measurements may include one or more of heterodyne processing, Fourier series processing, recursive unwrapping and iterative unwrapping.

The optimum number, N, of wavelengths is preferably the minimum number of wavelengths required to obtain unambiguous phase measurements in the selected target measurement range, for the determined phase noise level. The method may include proposing a measure of process reliability associated with the determined phase noise level, corresponding to a known probability of success in fringe order identification. For example, a process reliability of $6\sigma$ may be proposed, where $\sigma$ is the standard deviation noise in a function (for example in the form of a fringe pattern) to be analysed: this function could, for example, be a discrete level heterodyne function generated from the wrapped phase measurements made at two different wavelengths (this discrete level heterodyne function will be used to obtain absolute phase data). The proposed process reliability is preferably used to calculate the minimum number, N, of wavelengths required to obtain unambiguous phase measurements in the selected target measurement range.

The selected values of said N wavelengths may define a geometric series or, alternatively, may be combined in post-processing techniques, for example heterodyne processing, to generate a geometric series of synthetic wavelengths. Where heterodyne processing is used, preferably the selected values of the N wavelengths are chosen such that only one heterodyne operation is required to generate each synthetic wavelength in the geometric series. If more than one heterodyne operation is required to generate a desired synthetic wavelength it will be appreciated that measurement noise levels will increase. In a preferred embodiment, the values of said N wavelengths may be selected in accordance with the following equation:

$$1/\lambda_i = 1/\lambda_0 - (1/\lambda_0)^{i-1/N-1}(1/L)^{N-i/N-1} \quad \text{(Equation A)}$$

where $i=1, \ldots, N$, where N is the number of wavelengths, $\lambda_0$ is the wavelength associated with the largest frequency, and $\lambda_i$ is the wavelength of the ith frequency, and L is the target measurement range. However, there are also other possible series of projected wavelengths which will generate the desired geometric series of synthetic wavelengths.

The inventive method may be applied in many different types of interferometry, for example, in single point and full field profilometry, synthetic-aperture radar (SAR) interferometry, multi-aperture synthesis techniques, and fringe projection techniques. For example, the method may be used for measuring the three-dimensional shape of an object which may have surface discontinuities. In this case, the target measurement range is preferably the range over which (absolute) depth measurements relating to the profile of the object are desired. (Alternatively, the target measurement range may be the desired field of view of the imaging system in which the method is applied.) The step of carrying out the multi-frequency interferometry may conveniently comprise:

recording a series of fringe patterns obtained when the object is illuminated with electromagnetic radiation at each of the selected N optimum wavelengths;

processing the recorded fringe patterns so as to obtain wrapped phase measurements in the form of a wrapped phase map for each of the N optimum wavelengths, and processing the wrapped phase maps to determine absolute fringe orders in the fringe patterns. The absolute fringe orders may be calculated using heterodyne processing and/or iterative unwrapping of the wrapped phase maps. The determined absolute fringe orders can then be used to unambiguously unwrap the wrapped phase maps, from which unwrapped phase maps a three-dimensional profile of the object can be compiled.

It will be appreciated that, depending on the particular interferometry technique being used, there will be various ways of illuminating the object with radiation at the desired optimum wavelengths. For example, in fringe projection based interferometry, white light illumination is used to project a predetermined fringe pattern on to the object to be measured. In this case, it will be appreciated that the object is in effect illuminated at a synthetic wavelength (hereinafter referred to as the "projected wavelength"), this projected wavelength being determined by the chosen fringe pattern projected onto the object. In the present invention, if the multi-frequency interferometry is carried out using fringe projection, the selected series of N optimum wavelengths are therefore different projected wavelengths at which the object must be illuminated. In other forms of interferometry the selected series of N optimum wavelengths may be actual different wavelengths of light, normally in the form of laser beams, with which the object must be illuminated (usually sequentially). Thus, the recorded fringe patterns may be interferograms (produced in phase measuring sensors, including interferometers and single point and full-field systems) or may be deformed fringe patterns produced in fringe projection interferometry.

If the multi-frequency interferometry is carried out using fringe projection, the optimum values of the projected wavelengths may be selected in accordance with the following re-written version of Equation A:

$$N_{f_i} = N_{f_0} - (N_{f_0})^{\frac{i-1}{\lambda-1}}, \text{ for } i = 1, 2, \ldots, \lambda \quad \text{(Equation B)}$$

where $\lambda$ is the number of projected wavelengths, $N_{f_0}$ is the number of projected fringes in the largest fringe set, and $N_{f_i}$ is the number of projected fringes in the $i^{th}$ fringe set. Alternatively, where the number, N, of wavelengths is three, the selected values of the three wavelengths may be $N_{f_0}$, $N_{f_0} - \sqrt{N_{f_0}}$, and $\sqrt{N_{f_0}} - 1$.

Preferably, at each said optimum wavelength a series of fringe patterns is recorded. Most preferably, a series of phase-stepped fringe patterns is recorded at each of the N wavelengths with which the object is illuminated. The phase-stepped fringe patterns can be used to create a wrapped phase map for each said optimum wavelength. Alternatively, the wrapped phase maps may be obtained using Fourier transform processing of a single fringe pattern recorded at each said optimum wavelength.

The object may be illuminated separately and sequentially with each of the selected optimum (real or projected) wavelengths of electromagnetic radiation. Alternatively, the object may be illuminated with white light and a plurality of the desired fringe patterns may be captured simultaneously by recording them with an image detector which can simultaneously capture image data at the selected optimum wavelengths. For example, if the selected optimum wavelengths lie in discrete blue, green and red colour bands, a colour camera can be used to separately but simultaneously capture image data at red, green and blue frequencies. In another possible embodiment, the inventive method may be used in high speed single point ranging applications. In this case the desired measurand is of course absolute range. In one possibility, the multi-frequency interferometry may be carried out by illuminating the object using a broadband femtosecond laser. Preferably, the output of the laser is split into two parts: one part illuminates the object and the other part is used as a reference arm. The interference of the object and reference light produces an interferogram in the from of a time-varying intensity signal which may conveniently be recorded using a single point detector, for example a photodiode. The spectral range of the broadband pulses emitted by the laser is chosen so as to include the desired optimum series of values of said N wavelengths, for the target measurement range, L, selected in accordance with the inventive method. Other unwanted wavelengths can be filtered out, so that only interferograms at each desired optimum wavelength are recorded. Phase measuring means may be provided to enable a wrapped phase measurement to be obtained for every, or nearly every, femtosecond pulse emitted by the laser. The absolute fringe orders in the interferograms may be determined by, for example, heterodyne processing or iterative unwrapping of the wrapped phase measurements.

From the above it will be generally appreciated that the invention provides a novel strategy for absolute fringe order identification in multi-wavelength interferometry based on optimum selection of the wavelengths to be used. As will be described in detail below with reference to the preferred embodiments, a theoretical model of the process has been developed which allows the process reliability to be quantified. The methodology produces a wavelength selection which is optimum with respect to the minimum number of wavelengths required to achieve a target dynamic range. Conversely, the maximum dynamic range is produced from a given number of optimally selected wavelengths utilised in a sensor. Thus, according to a further aspect of the invention there is provided a method of measuring absolute fringe order in a phase measuring sensor, wherein the method comprises:

selecting a number, N, of wavelengths of electromagnetic radiation to be used to illuminate an object, where $N \geq 3$;

determining a level of phase noise which will be present in wrapped phase measurements which will be made;

for the selected number, N, of wavelengths, and the determined phase noise level, selecting optimum values of the N wavelengths so as to achieve a maximum measurement range in which wrapped phase measurements can be made relating to a desired measurand of the object to be illuminated;

recording a series of fringe patterns obtained when the object is illuminated with electromagnetic radiation at each of the selected N optimum wavelengths; and processing the recorded fringe patterns to obtain at least one wrapped phase measurement at each of the selected N optimum wavelengths, and processing the wrapped phase measurements to determine absolute fringe orders in the fringe patterns.

According to another aspect of the invention there is provided a multi-frequency interferometer apparatus for shape measurement, comprising:

fringe projection means for generating a projected wavelength of illumination by projecting a predetermined fringe pattern on to an object; and image capture and recording means for capturing and recording a deformed fringe pattern obtained when said predetermined fringe pattern is projected on to the object, the image capture means being disposed at an angle to the direction of illumination of the object with the projected fringe pattern; and data processing means for processing recorded deformed fringe patterns so as to obtain phase measurements therefrom; wherein the fringe projection apparatus is variable such that an optimum series of projected wavelengths may be generated, the values of the wavelengths being such that, for a known level of phase noise in the apparatus, and a chosen number of projected wavelengths in said series, absolute fringe orders in the deformed fringe patterns are measurable over a maximum measurement range.

The fringe projection means may be any known means for producing projection fringes. For example, the fringe projection means may comprise a coherent fibre fringe projector for producing a pattern of Young's fringes across the object, or may comprise a spatial light modulator based fringe projector, or imaging means for imaging grating patterns on to the object.

It will be appreciated that the new concept introduced for optimum wavelength selection is readily scalable, i.e. from a three wavelength system to a four wavelength system, from four wavelengths to five etc. Therefore, whilst the previous technology described in WO97/36144 and reference [8] allowed $2^{N-1}$ fringes to be counted absolutely where N is the number of fringe frequencies used, the new technique scales as $n^{N-1}$, where n is an arbitrary real number limited by phase noise of a practical interferometer.

Preferred embodiments of the invention will now be described by way of example only and with reference to the accompanying drawings in which.

A detailed analysis of the theoretical basis of the invention will now be described, followed by a description of various practical embodiments. This analysis is presented with reference to fringe projection interferometry, but it will be appreciated that the analysis is equally applicable to all forms of interferometry in which it is desired to determine absolute fringe order in an interferogram.

Theoretical Development

Two Wavelength Interferometry

In two wavelength heterodyne fringe projection interferometry to eliminate step height ambiguity the difference in the number of fringes projected across the field of view must be <1. Let the number of projected fringes across the field be $N_{\lambda 1}$ for the $i^{th}$ wavelength; then $N_{\lambda 1}-N_{\lambda 2}<1$ with $N_{\lambda 1}>N_{\lambda 2}$. The difference in wrapped phases calculated at the two wavelengths, a heterodyne function, can be expressed as a phase within the interval $-\pi$ to $\pi$ and will consist of a monotonic ramp across the image. A convenient representation is to calculate a discrete phase level for each of the fringe orders corresponding to $N_{\lambda 1}$. This is obtained by subtracting a scaled version of the wrapped phase at $N_{\lambda 1}$ from the heterodyne function—the scaling factor being given by $(N_{\lambda 1}-N_{\lambda 2})/N_{\lambda 1}$. In practice, such a discrete level heterodyne function can only identify a limited number of fringe orders owing to the presence of phase noise. Each $N_{\lambda 1}$ is known, as it is set in a white light system or can be measured in coherent systems [9]. Each wrapped phase measurement contains phase noise, which is modelled as a Gaussian distribution with zero mean and a standard deviation of $\sigma_\phi$ [10]. The heterodyne function then contains noise with a standard deviation given by $\sqrt{2}\pi_\phi$. We define a process robustness of $6\sigma$, corresponding to a probability of 99.73% success in fringe order identification within the measurement system. Therefore, the discrete phase levels must be separated in phase by at least $6\sqrt{2}\sigma_\phi$. Hence, for $6\sigma$ reliability the number of fringes which can be correctly identified is limited by:

$$N_{\lambda 1} \leq \frac{2\pi}{6\sqrt{2}\,\sigma_\phi}.$$

Defining the measurement dynamic range as the product of the phase resolution and the number of fringes successfully numbered. Therefore, for a phase resolution of $\frac{1}{100}^{th}$ of a fringe, 0.12 fringes can be numbered to $6\sigma$ reliability, giving a dynamic range of 1200, which is insufficient for most engineering applications.

Optimally Selected Wavelengths in N Wavelength Interferometry

The introduction of a third projected wavelength allows the generation of two independent heterodyne functions containing $N_{DL1}$ and $N_{DL2}$ discrete levels, where $N_{DL1} \times N_{DL2}=N_{\lambda 1}$. The discrete phase levels in each modified heterodyne function will be separated by:

$$\partial_{DL1}=2\pi/N_{DL2}, \text{ and } \partial_{DL2}=2\pi/N_{DL1}. \tag{1}$$

In this arrangement it is found that as $\partial_{DL1}$ increases $\partial_{DL2}$ decreases. Therefore, for maximum overall reliability in fringe order identification the optimum set of projected fringe wavelengths is given by the symmetrical arrangement where $\partial_{DL1}=\partial_{DL2}$ and $N_{DL1}=N_{DL2}=\sqrt{N_{\lambda 1}}$. If the number of discrete levels is not balanced the effect is to increase one of $N_{DL1}$ and $N_{DL2}$, thereby bringing $\partial_{DL1}$ or $\partial_{DL2}$ closer to the noise limit. Hence, from equation (1), with an optimised three wavelength approach the condition for $6\sigma$ reliability fringe order identification is given by, $$\sqrt{N_{\lambda 1}} \leq \frac{2\pi}{6\sqrt{2}\,\sigma_\phi}. \tag{2}$$

The number of fringes which may be heterodyned reliably in an optimum three wavelength heterodyne set-up is therefore the square of that for the two wavelength case for the same phase measurement noise.

Equations 1,2 are used to define general expressions relating the numbers of projected fringes at the N wavelengths. By assuming $N_{f_0}>N_{f_1}$ and $$N_{DL1} \times N_{DL2} \times \ldots \times N_{DL2}=N_{f_0},$$

with $N_{DL1}=N_{DL2}=\ldots=N_{DL1}$, for optimum noise immunity, it is here proposed that the numbers of projected fringes should be selected in accordance with the following expression:

$$N_{f_i} = N_{f_0} - (N_{f_0})^{\frac{i-1}{\lambda-1}}, \text{ for } i=1, 2, \ldots, \lambda \tag{3}$$

where: $\lambda$ number of wavelengths, $N_{f_0}$ number of fringes in the largest fringe set, $N_{f_i}$ number of fringes in the $i^{th}$ fringe set. The term $N_{f_\lambda}=0$ is included in order to generalize the expressions that follow. The general formulas to calculate the fringe order are given by:

$$DL_i = H_{0,i} - \frac{N_{f_0}-N_{f_i}}{N_{f_0}-N_{f_{i+1}}} \times H_{0,i+1} \tag{4}$$

$$IDL_{i+1} = NINT\left[(DL_1 + 2\pi \times IDL_1) \times \left(\frac{N_{f_0}-N_{f_{i+1}}}{N_{f_0}-N_{f_i}}\right) \times 2\pi\right] \tag{5}$$

for $i=1, \ldots, \lambda-1$, where $DL_i$ is the $i^{th}$ discrete level function, $IDL_i$ is the is integer discrete level, $H_{0,i}$ is the heterodyne between the 0 and $i^{th}$ wrapped phase map and NINT denotes taking the nearest integer. The recursive relationship for the integer discrete level functions is initialised by setting $IDL_0=0$. The fringe order for the wrapped phase map with $N_{f_0}$ fringes is given by $IDL_\lambda$ from equation (5).

Figure 1:
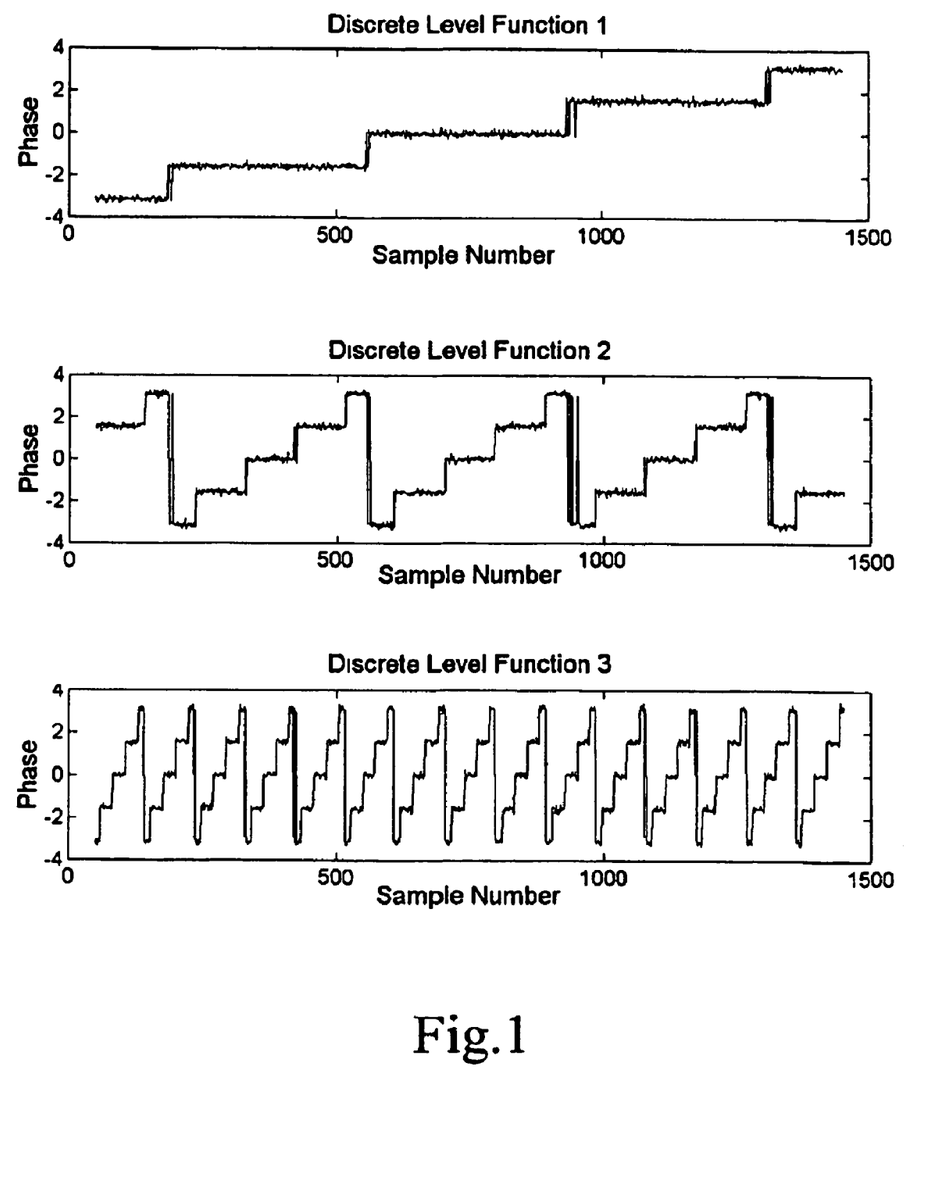
FIG. 1 illustrates graphically the three discrete level heterodyne functions for an optimum 4-λ process.

For example using four synthetic (i.e. projected) wavelengths with $N_{f_0}=64$, then $N_{f_1}=63$, $N_{f_2}=60$, $N_{f_3}=48$, FIG. 1 shows the discrete level functions resulting from a simulation of the process. The phase difference between discrete levels (y-axis) is equal in each plot as expected for an optimum wavelength configuration. In this case $N_{\lambda 1}=64$ and this means the discrete level functions contain 1 fringe with 4 discrete levels on it (1*4=4 fringe orders), 4 fringes each with 4 discrete levels on them (4*4=16 fringe orders), and 16 fringes each with 4 discrete levels on them (4*16=64 fringe orders). So we have the pattern 1, 4, 16, 64, or to be generic: $(N_{\lambda 1})^{1/3}$, $(N_{\lambda 1})^{2/3}$, $N_{\lambda 1}$, where we note that we are dealing with cube roots which is the number of wavelengths−1. The number sequence here defines a geometric series, where the factor relating neighbouring terms is $N_{DL}$. The geometric series can be expressed as $$(N_{f_0})^{\frac{i-1}{\lambda-1}}, \text{ for } i = 1, 2, \ldots, \lambda,$$

where $\lambda$ is number of wavelengths.

A multiplicative intensity noise of 2.5% has been applied to the cosine intensity fringes which is representative of scientific CCD cameras and is a primary source of phase noise.

It is here proposed that the number of fringes that may be numbered to $6\sigma$ reliability for a system with $\lambda$ wavelengths is given by (from equation (2) above):

$$\sqrt[\lambda-1]{N_{\lambda 1}} \leq \frac{2\pi}{6\sqrt{2}\,\sigma_\phi} \quad (6)$$

The reliability of the process only depends on the first and last wrapped phase maps with all intermediate values for other wavelengths cancelling out (see equations 4 and 5). As the last wavelength corresponds to zero fringes, rather than performing a phase measurement here it is more accurate to set the wrapped phases for this wavelength to zero. Hence the process reliability depends only on the error in the wrapped phase map at $N_{f_0}$. Therefore, as the number of wavelengths used is increased the process reliability remains unchanged and the number of fringes that may be labelled increases as given by equation 6.

An alternative representation of equation 6 is useful for some applications and obtained by noting that $L/\lambda_{\lambda,i} = N_{fi}$ where: $\lambda_{\lambda,i}$ is the wavelength associated with the $i^{th}$ frequency and L is the desired unambiguous measurement range. Equation 6 would then be re-expressed as:

$$\sqrt[\lambda-1]{\frac{L}{\lambda_{\lambda 1}}} \leq \frac{2\pi}{6\sqrt{2}\,\sigma_\phi}. \quad (7)$$

FIG. 1 shows simulated (i.e. computer generated) phases calculated at the synthetic (i.e. projected) wavelengths for optimum four-frequency interferometry with $L/\lambda_0=64$.

In any measurement situation the phase noise will be measured and hence known, and the target measurement range, L, will be known. Then equation 6 can be used to determine the number of wavelengths needed to make $N_{\lambda,1}$ large enough to span the desired measurement range, in that: $N_{\lambda,1}=L/\lambda_0$, where $\lambda_0$ is the wavelength associated with the largest frequency. The result of this will be the minimum number of wavelengths, $\lambda$, needed to achieve the target measurement range for the particular sensor system.

Figure 2:
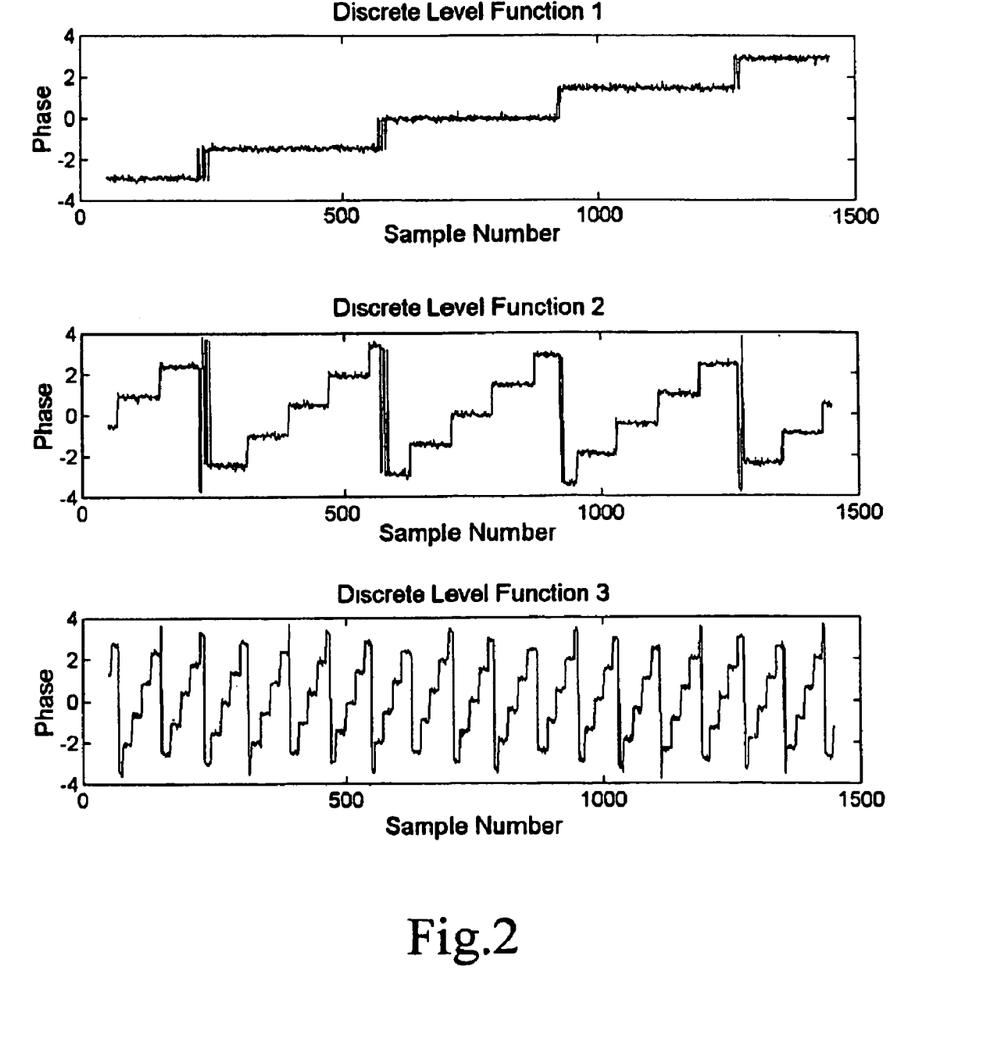
FIG. 2 illustrates graphically the three discrete level heterodyne functions for an optimum 4-λ process with a total of 80.765 fringes.
Figure 3:
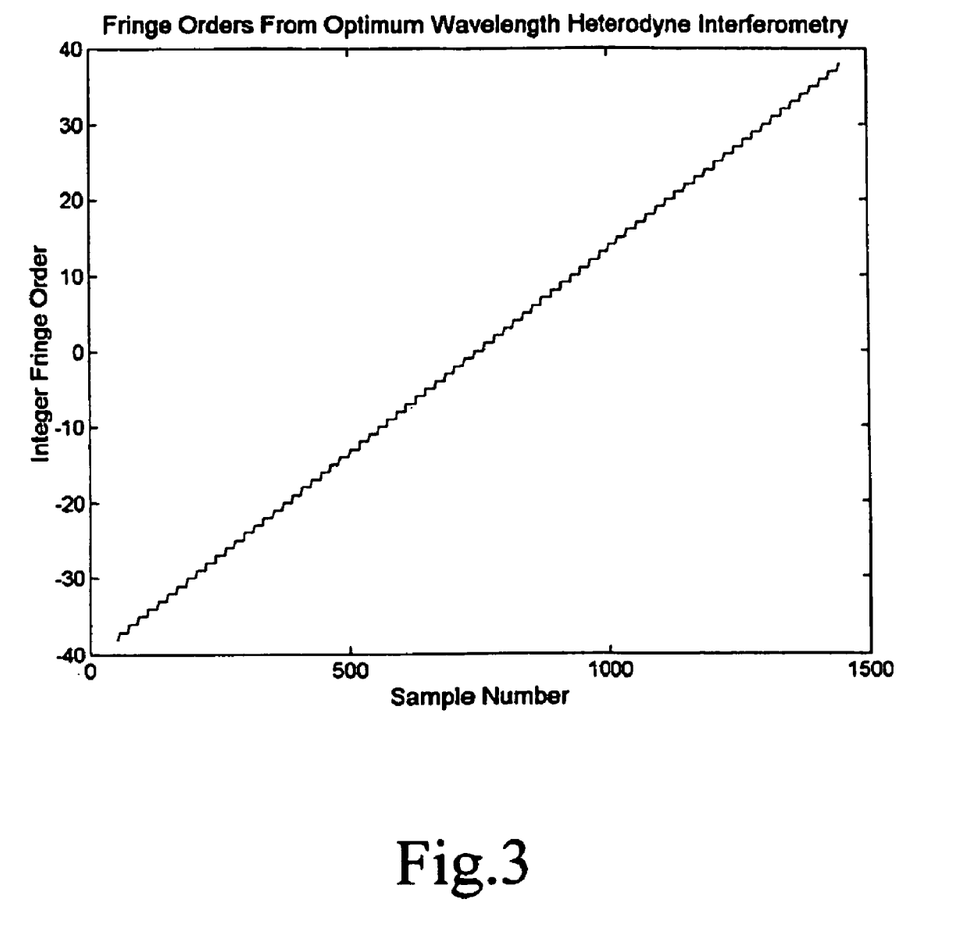
FIG. 3 is a graph of Fringe Order against Sample Number across an area detector, where the Sample Number is a function of position across an object, calculated for the same optimum 4-λ process as FIG. 2, having a total of 80.765 fringes.

It should be noted that in the example of FIG. 1, the value $(N_{f_0})^{\lambda-1}$ is an integer and therefore the discrete levels are equal in phase values for each discrete level function. For any real positive number, $(N_{f_0})^{\lambda-1}$, the algorithms function correctly. For example, $N_{f_0}=80.765$ and using four projected fringe wavelengths the discrete level functions are given in FIG. 2 (again showing simulated phases). The recursive unwrapping process correctly unwraps successive beat fringes to obtain the fringe order, as seen in FIG. 3.

For a typical four wavelength system $\sigma_\phi=2\pi/85$ and the number of fringes that can be correctly identified with $6\sigma$ reliability is >1000, giving a dynamic range of >85000. The following table (Table 1) shows values for $N_{f_0}$ and dynamic range for a range of $\lambda$ and $\sigma_\phi$.

TABLE 1

Numbers of fringes and dynamic range obtained with 99.73% reliability for optimum 3-$\lambda$ and 4-$\lambda$ heterodyne processing.

| Phase Noise (rms, radians) | Optimum 3-$\lambda$ Heterodyne | | Optimum 4-$\lambda$ Heterodyne | |
|---|---|---|---|---|
| | $N_{f0}$ | Dynamic Range | $N_{f0}$ | Dynamic Range |
| $2\pi/50$ | 35 | 1,736 | 205 | 10,230 |
| $2\pi/100$ | 139 | 13,889 | 1,637 | 163,700 |
| $2\pi/200$ | 556 | 111,111 | 13,095 | 2,619,000 |
| $2\pi/400$ | 2,222 | 888,889 | 104,707 | 41,902,800 |

It will be understood that although in the above description we have proposed $6\sigma$ process reliability, the process reliability may be defined by other values as desired, for example $8\sigma$ reliability, in which case equation (6) becomes:

$$\sqrt[\lambda-1]{N_{\lambda 1}} \leq \frac{2\pi}{8\sqrt{2}\,\sigma_\phi}$$

Alternative Strategies for Generating Optimum Wavelengths

There are alternative ways to calculate the numbers of fringes used at each wavelength that result in optimum configurations in the discrete level functions. For example using the three projected wavelengths given by $N_{f_0}$, $N_{f_0}-\sqrt{N_{f_0}}$, $\sqrt{N_{f_0}}-1$, these can be heterodyned together as follows to obtain the desired geometric series 1, $\sqrt{N_{f_0}}$, $N_{f_0}$: heterodyne $N_{f_0}$ with $N_{f_0}-\sqrt{N_{f_0}}$ to get $\sqrt{N_{f_0}}$; heterodyne this with $\sqrt{N_{f_0}}-1$ to get 1. Equations 4 and 5 may than be applied as before. It is expected that the noise floor is worse in this case (than for wavelengths selected in accordance with Equation 3) as it relies on two heterodyne operations to get one of the synthetic wavelengths (the 1) in the geometric series. There are also many other possibilities to arrive at the desired geometric series 1, $\sqrt{N_{f_0}}$, $N_{f_0}$, the only difference in the various ways is the number of heterodyne operations required in each case. However, the noise level will increase the greater the number of heterodyne operations that are required to obtain any synthetic wavelength in the desired geometric series.

In fact, if the maximum number of heterodyne operations to get to a member of the geometric series is denoted by r, the measurement range equation 6 can be re-expressed as:

$$\sqrt[\lambda-1]{N_{\lambda 1}} \leq \frac{2\pi}{6\sqrt{r+1}\,\sigma_\phi} \quad (7)$$

For example, in the three wavelength case, if the original projected wavelength selection is 100, 99, 90 a single heterodyne is needed to get to each term in the desired geometric series 1, 10, 100 and hence r=1, leading to equation 6.

In fact, in the case of fringe projection using three wavelengths, one could capture directly a fringe pattern with the projected wavelengths corresponding to 1, $\sqrt{N_{f_0}}$, and $N_{f_0}$ fringes and apply iterative unwrapping to these directly. This would be instead of the more usual capture of $N_{f_0}$, $N_{f_0}-1$, $N_{f_0}-\sqrt{N_{f_0}}$ (as proposed by equation 3), then heterodyne (i.e. "beat") $N_{f_0}$ with $N_{f_0}-1$ to get 1, and beat $N_{f_0}$ with $N_{f_0}-\sqrt{N_{f_0}}$ to get the $\sqrt{N_{f_0}}$ and then apply iterative unwrapping to the derived data at 1, $\sqrt{N_{f_0}}$, and $N_{f_0}$ fringes.

Capturing directly a fringe pattern at the series 1, $\sqrt{N_{f_0}}$ and $N_{f_0}$ fringes thus corresponds to the case r=0 in equation 7 above. In this case it will be appreciated that discrete level functions can be formed directly in the processing stage without heterodyning first. The discrete level function is obtained by subtracting a scaled version of the wrapped phase at the next higher frequency in the series, e.g. for 3 wavelengths to get $\sqrt{N_{f_0}}$ levels on the single unambiguous fringe the phase measured with $\sqrt{N_{f_0}}$ fringes is multiplied by $1/\sqrt{N_{f_0}}$ and subtracted from the phase obtained with a single fringe. The discrete level functions may then be iteratively unwrapped. The geometric series 1, $\sqrt{N_{f_0}}$, $N_{f_0}$ still provides an equal factor of $\sqrt{N_{f_0}}$ in going from 1 to $\sqrt{N_{f_0}}$ to $N_{f_0}$. As these factors are equal, when the discrete level functions are calculated they will contain equal numbers of discrete levels per fringe and hence the process reliability is equal in the discrete level functions and the reliability of the process overall is optimised. From this it will be understood that in some possible embodiments of the invention the projected wavelengths may be chosen so as to match exactly the desired geometric series i.e. the series defined by $$(N_{f_0})^{\frac{i-1}{\lambda-1}}, \text{ for } i = 1, 2, \ldots, \lambda,$$

where $\lambda$ is number of wavelengths.

Modifications to the Theoretical Description

To allow for experimental error in obtaining exactly the number of fringes required across the measurement range, the wavelengths would be selected close to their theoretical values but in such a way as to define an unambiguous measurement range slightly larger than that required. For example, the second wavelength (i=2, in equation 3) may be modified by up to 30% in order to guarantee forming less than one beat fringe across the desired measurement range. Therefore, in practical systems it would be common to use $N_{f_0}$, $N_{f_0}-0.7$, $N_{f_0}-\sqrt{N_{f_0}}$ for a three wavelength system.

Experimental Demonstration

Figure 4A:
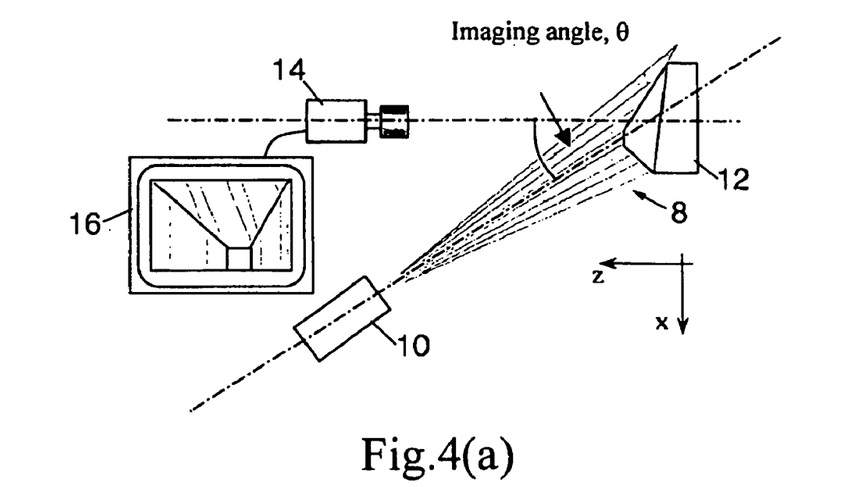
FIG. 4(a) is a schematic diagram of an experimental set-up for fringe projection shape measurement.
Figure 4B:
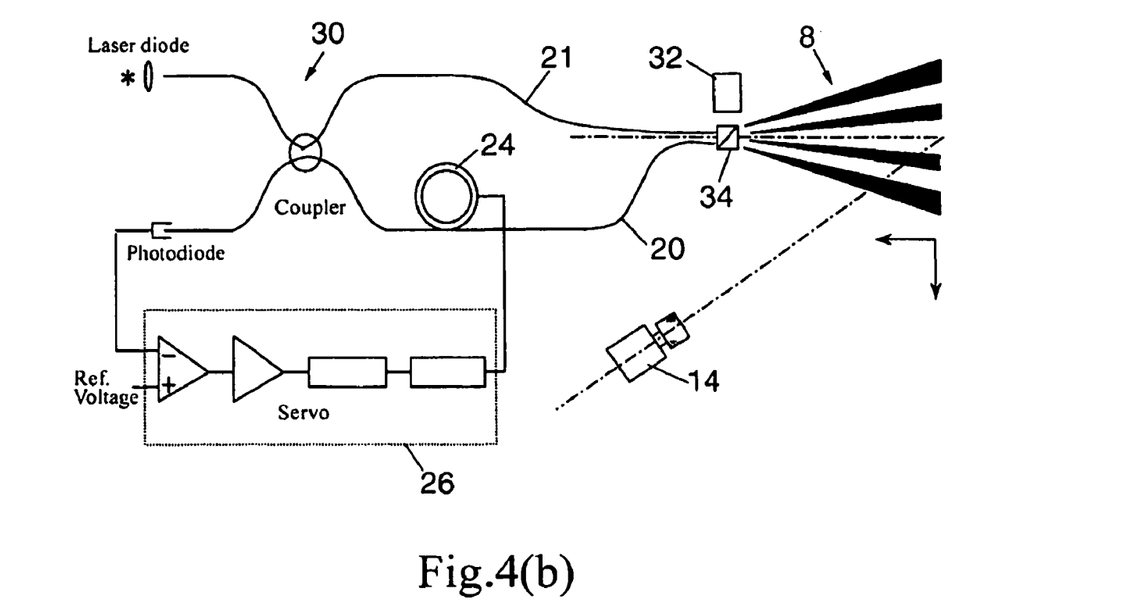
FIG. 4(b) is a schematic diagram illustrating a typical fibre fringe projector for use in the experimental set-up of FIG. 4(a)
Figure 5:
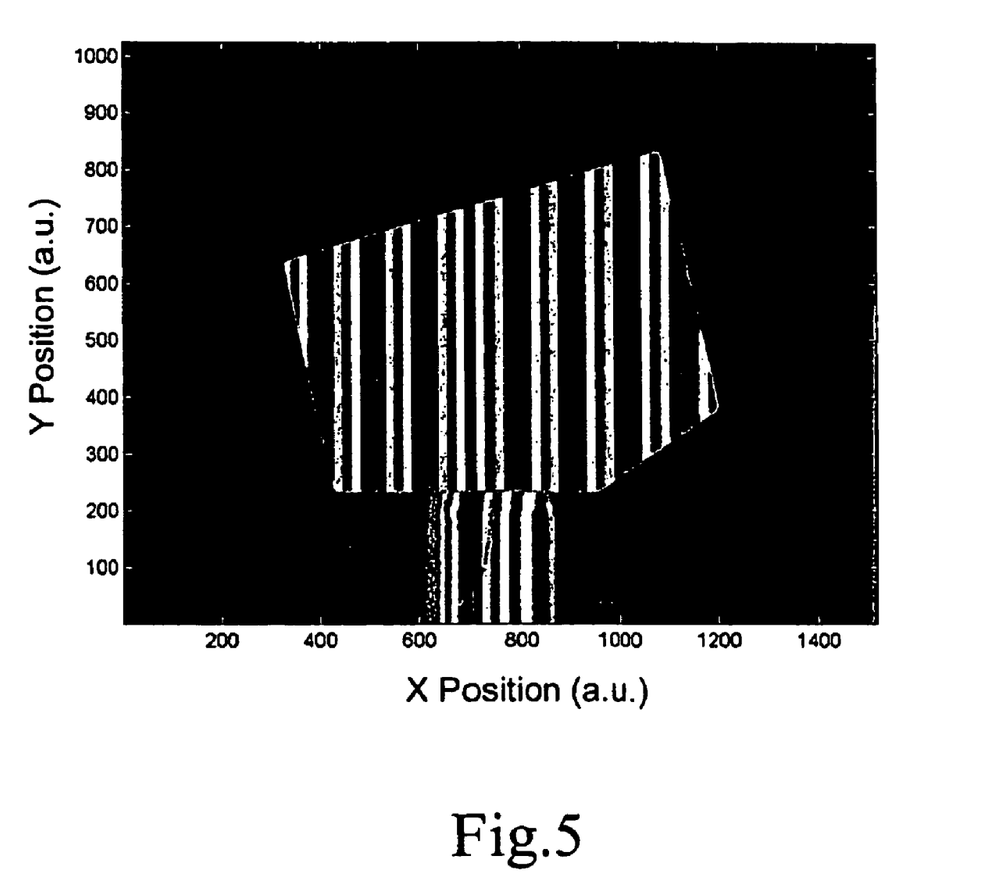
FIG. 5 is an experimentally obtained fringe order map for optimum 3-λ heterodyne processing.

A whole field, triangulation based shape measurement system is given as the exemplar for the above theoretical analysis. In this system a coherent fibre fringe projector 10 is used to produce a pattern of Young's fringes 8 across a test object 12. A CCD camera 14 is then placed at an angle $\theta$ to the illumination direction to view the fringes, as shown in FIG. 4(a). The CCD camera 14 is connected to a computer system 16 for implementing the data processing scheme (in particular, the heterodyne operations and the recursive unwrapping algorithms specified by equations (4) and (5) above) and control of the data acquisition process. The computer system includes a memory for recording fringe patterns captured by the CCD camera 14. The computer system is programmed to carry out the phase unwrapping and fringe order identification processes as herein described in accordance with the invention. Increasing the number of projected fringes or the angular separation $\theta$ between the CCD camera 14 and the fringe projector 10 increases the sensitivity to the depth (z) of the test object 12. FIG. 4(b) illustrates in more detail the features of the fibre fringe projector 10. Like parts in FIGS. 4(a) and (b) are referenced by like numerals. In known manner, this comprises two output fibres 20,21 having their ends placed side-by-side with a spacing therebetween. One of the output fibres 20 was wrapped around a cylindrical PZT 24 to allow the optical phase to be modulated. A servo control system 26 allows the phase of the projected fringes to be stabilised by monitoring the reflections from the distal ends of the output fibres at the 4th arm of a directional coupler 30. The servo also enables accurate 90° phase steps to be obtained [11]. A second CCD camera 32 was incorporated into the fringe projector to measure the fibre separation, and hence the number of projected fringes. The fringes were sampled directly onto the second CCD camera 32 via a polarising beamsplitter 34. A measurement of the phase distribution across this CCD camera 32 gives the fibre separation and hence the number of projected fringes [9]. The fibre separation can be varied by means of a linear traverse (not shown) on which one of the fibre ends is mounted. We have demonstrated a resolution of <10 nm in the fibre separation measurement compared to a 50 nm requirement predicted by a simulation for three projected wavelengths. To demonstrate the process, the flat side of an object was assessed initially as this gave easy verification of the fringe order calculation. Three wavelengths were used (from equation 3 above) with 100, 99 and 90 projected fringes. FIG. 5 shows the result of applying equations 4 and 5 to the three wrapped phase maps obtained. The central fringe is automatically identified by the heterodyne process and is coloured black. The fringe orders are clearly identified as a repeating scheme of 6 colours either side of the central fringe.

The phase resolution obtained was estimated to be $1/80^{th}$ fringe principally limited by the random speckle phase which contributes to the interference phase. With $\sigma_\phi = 2\pi/80$ and $N_{f_0}=100$ equation 2 can be manipulated to determine the fringe order numbering reliability expected from theory which evaluates to 99.53%. A local neighbourhood check applied to the central flat area of the experimental data in FIG. 5 shows the number of pixels giving the correct fringe order to be 99.52%. Therefore, a validation of the process and the underlying theory has been demonstrated.

The new process is equally applicable to white light fringe projectors based on spatial light modulators or on custom gratings produced on glass substrates. Compared to the reverse exponential temporal unwrapping scheme [8], to measure over ~100 fringes requires 8 wrapped phase maps to be obtained. Therefore, the use of the new algorithm enables a reduction in data acquisition time and data space of >60%. The dynamic range obtained in this measurement was 1:8000.

The above described embodiment provides a robust measurement process based on multiple wavelengths, phase measurement and heterodyne processing. It is shown that given a certain phase measurement noise it is possible to maximise the number of fringe orders unambiguously identifiable and therefore the measurement dynamic range. Each fringe order can be identified as an absolute number. A robustness measure based on Gaussian statistics is derived for the process.

It will be appreciated that the inventive process is applicable to any form of interferometric sensor where phase measurements are available at defined sensitivities (wavelengths), not simply only to fringe projection based phase measuring sensors. For interferometric sensors not based on fringe projection, the equivalent of the optimum noise immunity condition $N_{DL1}=N_{DL2}=\ldots=N_{DLi}$ proposed above for fringe projection sensors is:

$$\Lambda_{01}/\Lambda_{02}=\Lambda_{02}/\Lambda_{03}=\ldots=\Lambda_{0,N-1}/\lambda_0 \quad (8)$$

where $\Lambda_{01}, \Lambda_{02}, \Lambda_{03}, \ldots, \Lambda_{0,N-1}$ are the synthetic (beat) wavelengths formed when $\lambda_0$ is heterodyned with $\lambda_1, \lambda_2, \lambda_3, \ldots, \lambda_{N-1}$ respectively, e.g. $\Lambda_0$ is the phase difference between phase measurements at $\lambda_0$ and $\lambda_1$ and is defined by: $\Lambda_{01}=\lambda_0\lambda_1/(\lambda_1-\lambda_0)$. In this case the equation (3) is re-expressed as:

$$1/\lambda_i=1/\lambda_0-(1/\lambda_0)^{i-1/N-1}(1/L)^{N-i/N-1} \quad \text{(Equation A)}$$

where i=1, ..., N, where N is the number of wavelengths, $\lambda_0$ is the wavelength associated with the largest frequency, and $\lambda_i$ is the wavelength of the ith frequency, and L is the target measurement range. However, again it will be appreciated that alternative series of wavelength values are possible which can be combined in post-processing to produce the desired geometric series of synthetic wavelengths satisfying equation 8 above. With reference to equation (7) above, the r=0 case is also possible (i.e. the wavelengths are chosen to match the desired geometric series, without processing heterodyne operations being required) as long as the required range of wavelengths is available from the wavelength sources being used and are detectable using sensors. In practice, the visible wavelength range will not be broad enough to offer an r=0 solution, but an example where it would be possible is in radar systems where the wavelength range available is orders of magnitude broader.

Figure 6:
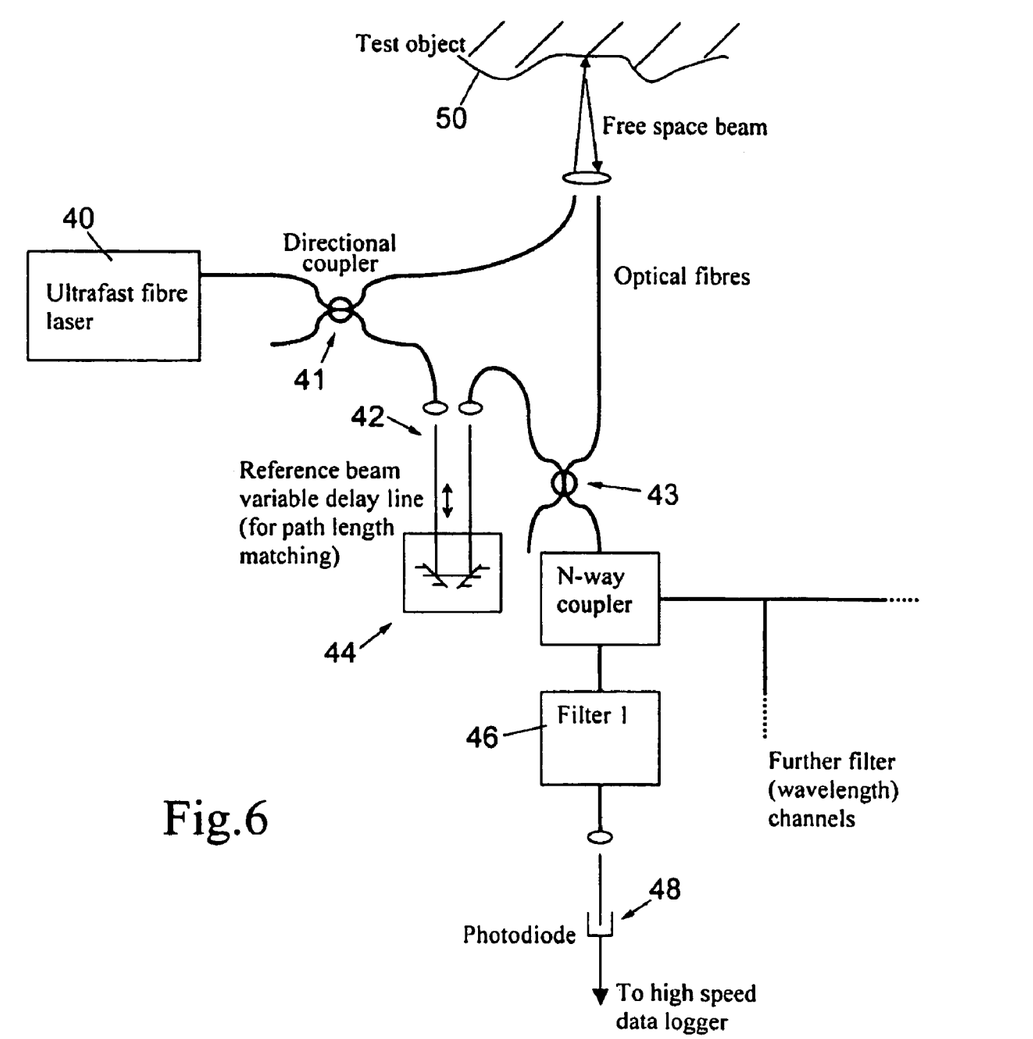
FIG. 6 is a schematic diagram of a high speed single point ranging sensor.

Examples of alternative inventive embodiments (not based on fringe projection) are:

a) High speed, single point ranging. In this application the aim is to monitor one point on a target object at high speed. Short pulse, pico and femtosecond, lasers produce a pulse of light over a broad range of wavelengths (as the pulse length shortens the wavelength range increases). FIG. 6 illustrates an example embodiment. The light from a pico or femtosecond laser 40 is split into two parts (using a first directional coupler 41), one part goes to the object 50 and the other acts as a reference beam 42 in a variable delay line 44 (for path length matching). Light scattered by the object 50 is then combined with the reference light (using a second directional coupler-43). For each wavelength required, a filter 46 is used to isolate that wavelength from the broad bandwidth pulse, with the filtered light detected on a single point detector 48 (a suitable example would be a photodiode). The output from the detector 48 is passed to a high speed data logger (not shown). In practise, a pair of detectors would be used in quadrature for each wavelength channel in order to calculate the optical phase. Thereby a phase measurement is obtained on each pulse from the laser. So the 'interferograms' (equivalent in purpose to the deformed fringe patterns used in the above-described fringe projection profilometry embodiment of FIG. 4) are mapped out in time from each detector as an intensity signal. The absolute phase information is obtained by post-processing the interferograms obtained at each wavelength in a similar manner to the post-processing of the wrapped phase maps obtained in the FIG. 4 embodiment, for example using heterodyne processing to generate data at the desired optimum geometric series of synthetic wavelengths, to extract the absolute phase data (from which absolute range measurements are calculable).

b) Colour camera application. In this embodiment simultaneous illumination of the object occurs at three wavelengths. The three wavelengths are chosen to reside in discrete colour bands, e.g. the red, green and blue components of a colour camera (having a known arrangement of red, green and blue pixels) with zero or minimal leakage of one component into the neighbouring colour band A colour camera provides simultaneous acquisition of the images in each of the colour bands. The colours may simply be used as a means of separating out the multi-wavelength image obtained at the colour camera in which case it would be preferable to obtain directly the data at the 1, $\sqrt{N}$, and N fringes, where N is the number of fringes in the highest resolution fringe set. Alternatively, the wavelengths would be selected to give (with some processing e.g. heterodyne operations) the geometric series defined by 1, $\sqrt{N}$, and N fringes. Phase data captured at these wavelengths could be heterodyned to get to the 1, $\sqrt{N}$, and N fringes and hence iteratively unwrapped. This latter approach may also be applied to other forms of interferometric sensing. Therefore, the multi-wavelength illumination would occur simultaneously. To obtain the phase data there are a number of options the most common of which is phase stepping. Here the phase of each fringe pattern at each wavelength needs to be varied to give at least three image sets and hence some temporal acquisition is still required. The next most common process is Fourier transform fringe analysis which derives the phase data from a single image. It will be appreciated that using the latter technique would enable all the required phase data to be captured in a genuinely "single snapshot" technique.

REFERENCES

1. R. Jones, C. Wykes, 'Holographic and Speckle Interferometry', Cambridge University Press, Cambridge, pp 199-203, 1983.
2. J. D. Valera, A. F. Doval and J. D. C. Jones "Determination of vibration phase with electronic speckle pattern interferometry" Electronics Letters, Volume 28, 2292-4, 1992.
3. P. A. Rosen, S. Hensley, I. R. Joughin, F. K. Li, S. N. Madsen, E. Rodriguez, R. M. Goldstein, "Synthetic Aperture Radar Interferometry" IEEE proceedings, Volume 88, Number 3, pp. 333, 2000.
4. B. P. Hildebrand, K. A. Haines, 'Multiple wavelength and multiple source holography applied to contour generation', JOSA, volume 57, number 2, pp 155-162, 1967.
5. K. Creath, 'Phase measurement interferometry techniques', in Progress in Optics, editor E. Wolf, volume 26, pp 349-393, 1988.
6. M. Takeda, H. Ina, and S. Kabayashi, "Fourier-transform method of fringe-pattern analysis for computer-based topography and intrferometry", J. Opt. Soc. Am, Volume 72, No. 1, pp. 156-160, 1982.
7. J. M. Huntley, 'Automated fringe pattern analysis in experimental mechanics: a review', The Journal of Strain Analysis for Engineering Design, March 1998, vol. 33, no. 2, pp. 105-125.
8. J. M. Huntley, H. O. Saldner, "Shape measurement by temporal phase unwrapping: comparison of unwrapping algorithms", Volume 8, pp. 986-992, 1997.

9. A. J. Moore, R. McBride, J. S. Barton, J. D. C. Jones, "Shape measurement using a fiber optic fringe projector with active homodyne phase stepping", SPIE, Volume 4076, pp. 174-180, 2000.
10. H. O. Saldner, J. M. Huntley, "Profilometry using temporal phase unwrapping and a spatial light modulator based fringe projector", Optical Engineering, Volume 36, pp. 610-615, 1997.
11. J. D. Valera and J. D. C. Jones "Phase stepping in projected fringe fibre based moire interferometry" Electronic Letters, Volume 29, pp. 1789, 1993.

The invention claimed is:

1. A multi-frequency interferometry method for measuring the absolute phase of an electromagnetic wave, wherein the method comprises:
   selecting a target measurement range, L, within which absolute phase measurements are desired to be made, said phase measurements being related to a desired measurand of an object;
   determining a level of phase noise which will be present in wrapped phase measurements which will be made;
   for the selected target measurement range, and the determined phase noise level, calculating an optimum number, N, of wavelengths of electromagnetic radiation to be used in the multi-frequency interferometry, where $N \geq 3$;
   selecting an optimum series of values of said N wavelengths to achieve optimum noise immunity in wrapped phase measurements to be made; and
   using a computer system to carry out multi-frequency interferometry at the selected values of the N wavelengths so as to produce and record at least one wrapped phase measurement at each of the N wavelengths, which recorded wrapped phase measurements are thereafter processed by the computing system to obtain an absolute phase measurement related to the desired measurand of the object.

2. The method according to claim 1, wherein the optimum number, N, of wavelengths is the minimum number of wavelengths required to obtain unambiguous phase measurements in the selected target measurement range, for the determined phase noise level.

3. The method according to claim 1 wherein the method includes proposing a measure of process reliability associated with the determined phase noise level, corresponding to a known probability of success in fringe order identification.

4. The method according to claim 3, wherein the proposed process reliability is $\sigma s$, where $\sigma$ is the standard deviation noise in a discrete level heterodyne function generated from the wrapped phase measurements made at two different wavelengths.

5. The method according to claim 3 wherein the proposed process reliability is used to calculate the minimum number, N, of wavelengths required to obtain unambiguous phase measurements in the selected target measurement range.

6. The method according to claim 1, wherein the processing of the wrapped phase measurements includes heterodyne processing.

7. The method according to claim 6, wherein the heterodyne processing produces a plurality of discrete level heterodyne functions each containing equal numbers of levels in the interval $-\pi$ to $+\pi$.

8. The method according claim 1, wherein the processing of the wrapped phase measurements includes iterative unwrapping.

9. The method according to claim 1, wherein the selected values of said N wavelengths define a geometric series.

10. The method according to claim 1, wherein the selected values of said N wavelengths are such that they can be combined in a predetermined manner to generate a geometric series of synthetic wavelengths.

11. The method according to claim 10, wherein the selected values of said N wavelengths are heterodyne processed to generate the geometric series of synthetic wavelengths.

12. The method according to claim 11, wherein the selected values of the N wavelengths are chosen such that only one heterodyne operation is required to generate each synthetic wavelength in the geometric series.

13. The method according to claim 10, wherein the values of said N wavelengths are selected in accordance with the following equation:

$$1/\lambda_i = 1/\lambda_0 - (1/\lambda_0)^{i-1/N-1}(1/L)^{N-i/N-1}$$

where $i=1, \ldots, N$, where N is the number of wavelengths, $\lambda_0$ is the wavelength associated with the largest frequency, and $\lambda_i$ is the wavelength of the ith frequency, and L is the target measurement range.

14. The method according to claim 1, wherein the method is used for measuring the three-dimensional shape of an object which may have surface discontinuities, and the target measurement range is the range over which absolute depth measurements relating to the profile of the object are desired.

15. The method according to claim 14, wherein the step of carrying out the multi-frequency interferometry comprises:
   recording a series of fringe patterns obtained when the object is illuminated with electromagnetic radiation at each of the selected N optimum wavelengths;
   processing the recorded fringe patterns so as to obtain wrapped phase measurements in the form of a wrapped phase map for each of the N optimum wavelengths, and processing the wrapped phase maps to determine absolute fringe orders in the fringe patterns.

16. The method according to claim 15, wherein the absolute fringe orders are calculated using at least one of heterodyne processing, recursive unwrapping and iterative unwrapping of the wrapped phase maps.

17. The method according to claim 15 wherein at each said optimum wavelength a series of phase-stepped fringe patterns is recorded.

18. The method according to claim 1, wherein the multi-frequency interferometry is carried out using fringe projection, and the selected series of N optimum wavelengths are synthetic wavelengths projected on to the object.

19. The method according to claim 18, wherein the selected values of the N synthetic wavelengths projected on to the object define a geometric series given by $$(N_{f_0})^{\frac{i-1}{\lambda-1}}, \text{ for } i = 1, 2, \ldots, \lambda,$$

where $\lambda$ is number of wavelengths and $N_{f_0}$ is the number of projected fringes in the largest fringe set.

20. The method according to claim 18, wherein the values of the N synthetic wavelengths projected on to the object are selected in accordance with the following equation:

$$N_{f_i} = N_{f_0} - (N_{f_0})^{\frac{i-1}{\lambda-1}}, \text{ for } i = 1, 2, \ldots, \lambda$$

where $\lambda$ is the number (1=N) of projected wavelengths, $N_{f_0}$ is the number of projected fringes in the largest fringe set, and $N_{f_i}$ is the number of projected fringes in the $i^{th}$ fringe set.

21. The method according to claim 18, wherein the number, N, of wavelengths is equal to three, and the selected values of the three wavelengths are $N_{f_0}$, $N_{f_0}-\sqrt{N_{f_0}}$, and $\sqrt{N_{f_0}}-1$, where $N_{f_0}$ is the number of projected fringes in the largest fringe set.

22. The method according to claim 1, wherein the object is illuminated separately and sequentially with each of the selected optimum wavelengths of electromagnetic radiation.

23. The method according to claim 14, wherein the object is illuminated with white light and a plurality of said fringe patterns are captured simultaneously by recording them with an image detector which can simultaneously capture image data at the selected optimum wavelengths.

24. The method according to claim 23 wherein the image detector is a colour camera.

25. The method according to claim 1, wherein the method is carried out in a single point ranging system in which the absolute phase measurements made are used to calculate absolute range.

26. The method according to claim 25, wherein the multi-frequency interferometry is carried out by illuminating the object using a broadband femtosecond laser.

27. The method according to claim 26, wherein the spectral range of the broadband pulses emitted by the laser is chosen so as to include the said optimum series of values of said N wavelengths.

28. A method of measuring absolute fringe order in a phase measuring sensor, wherein the method comprises:
    selecting a number, N, of wavelengths of electromagnetic radiation to be used to illuminate an object, where $N \geq 3$;
    determining a level of phase noise which will be present in wrapped phase measurements which will be made;
    for the selected number, N, of wavelengths, and the determined phase noise level, selecting optimum values of the N wavelengths so as to achieve a maximum measurement range in which wrapped phase measurements can be made relating to a desired measurand of the object to be illuminated;
    recording a series of fringe patterns obtained when the object is illuminated with electromagnetic radiation at each of the selected N optimum wavelengths; and
    processing the recorded fringe patterns to obtain at least one wrapped phase measurement at each of the selected N optimum wavelengths, and processing the wrapped phase measurements to determine absolute fringe orders in the fringe patterns.

29. A multi-frequency interferometer apparatus for shape measurement, comprising:
    fringe projection means for generating a projected wavelength of illumination by projecting a predetermined fringe pattern on to an object; and
    image capture and recording means for capturing and recording a deformed fringe pattern obtained when said predetermined fringe pattern is projected on to the object, the image capture means being disposed at an angle to the direction of illumination of the object with the projected fringe pattern; and
    data processing means for processing recorded deformed fringe patterns so as to obtain phase measurements therefrom; wherein
    the fringe projection apparatus generates an optimum series of projected wavelengths, the values of the wavelengths being such that, for a known level of phase noise in the apparatus, and a chosen number of projected wavelengths in said series, absolute fringe orders in the deformed fringe patterns are measurable over a maximum measurement range.

30. The apparatus according to claim 29, wherein the fringe projection means comprises a coherent fibre fringe projector for producing a pattern of Young's fringes across the object.

* * * * *